Jan. 31, 1967    P. THAUER    3,301,239
ADJUSTABLE VALVE DRIVE FOR INTERNAL COMBUSTION ENGINES
Filed July 10, 1964    2 Sheets-Sheet 1
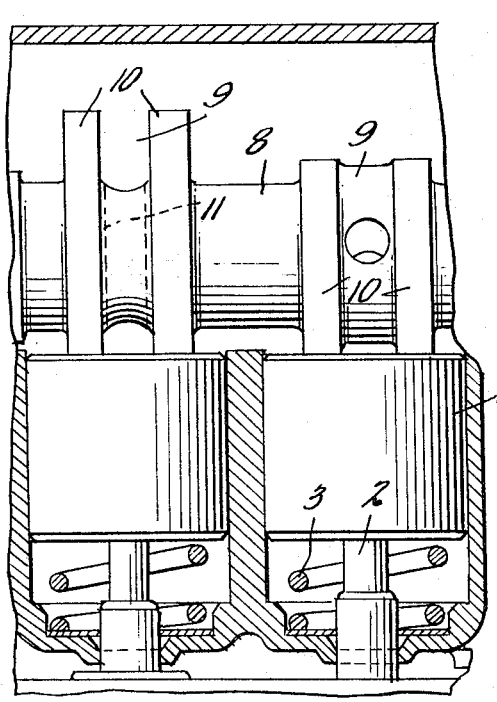
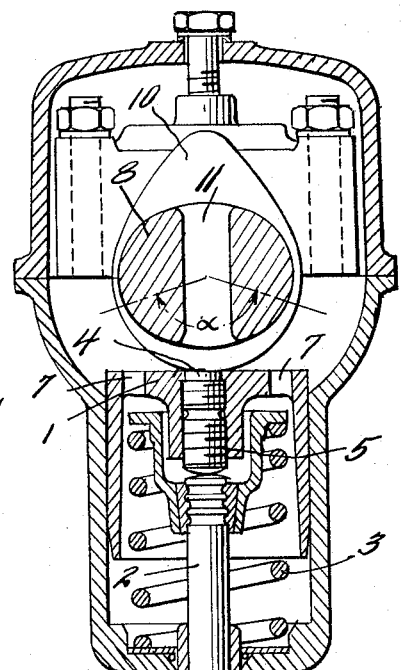
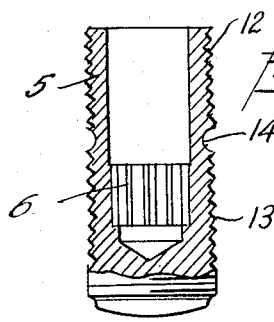
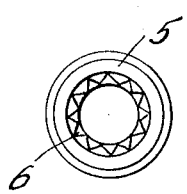
INVENTOR
Peter Thauer,
BY
Watson, Cole, Grindle & Watson
ATTORNEYS

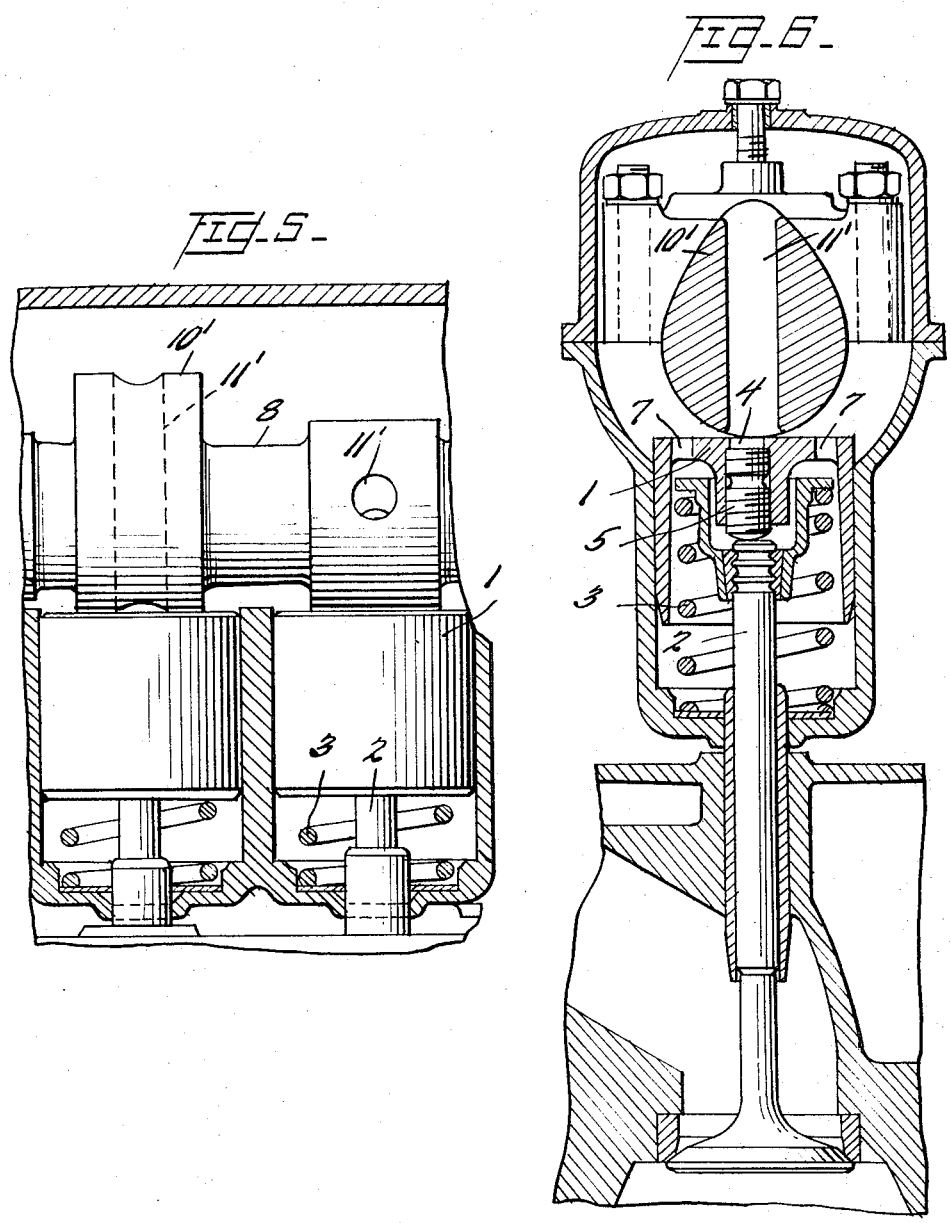

United States Patent Office 3,301,239
Patented Jan. 31, 1967

3,301,239
ADJUSTABLE VALVE DRIVE FOR INTERNAL COMBUSTION ENGINES
Peter Thauer, Am Seeteich 9, Neuhaus, Germany
Filed July 10, 1964, Ser. No. 381,731
Claims priority, application Germany, July 13, 1963, V 24,311
7 Claims. (Cl. 123—90)

This invention relates to valve operating drives and mechanism for internal combustion engines with directly operable top or head ram stroke action from particularly a top cam shaft.

In such an arrangement, in which the valve spring seats within the hollow of a pot-shaped ram, there is a simple construction and only a minimum structural height necessary. The known constructions of this type have however the drawback that the valve play can only be adjusted with difficulty and the setting is carried out for example by insertion of discs or shims of such hardness and strength between the valve shaft upper surface and the inner plane surface of the ram, whereby however, for each adjustment the cam shaft must be removed and then replaced.

It is an object of the invention to provide a very simple adjustment structure which is attained in that in a bore or passage in the top surface of each pot ram there is provided a setscrew or adjusting bolt with a further development of the invention, to provide a transverse bore above the setscrew and in the cam shaft.

A further object of the invention resides in the provision of making it possible to adjust the valve play by the insertion of a tool through a bore of the cam shaft and thus an extension or enlargement of the cam shaft is not necessary.

In order to attain an inferior or low wear and tear, the setting or adjusting screw is advantageously provided somewhat eccentrically in the pot ram relative to the valve stem. The transverse bore will be provided adjacent the particular cam or in the cam itself, particularly in the middle of the groove of the cam. The cross section of the cam shaft can be strengthened in the region of the transverse bore. Appropriately the setting screw may be provided with a plurality of internal teeth, particularly a plurality of edges of approximately twelve in number to facilitate the insertion and grip of an adjusting tool. In order to secure the ram against rotation, the setting screw may be provided with one or more holes in the upper surface of the ram which also serve the purpose of ventilating the pot-shaped ram and the chamber or space in which the ram operates.

Further objects will be apparent from the following description when considered in connection with the accompanying drawing in which:

FIGURE 1 is a vertical sectional view illustrating the valve and valve drive according to the invention;

FIGURE 2 is a side elevation partly in section of a pair of valve stems and rams on an enlarged scale;

FIGURE 3 is a vertical sectional view of the adjusting screw;

FIGURE 4 is a top plan view of the adjusting screw;

FIGURE 5 is a side elevation partly in section showing a modified structure; and FIGURE 6 is a vertical sectional view of the structure of FIGURE 5.

The pot-shaped or circular ram 1 which extends over the upper end of the valve stem 2 with the valve spring 3 and the adjacent parts belonging thereto, is provided with a screw-threaded bore 4 slightly adjacent the middle longitudinal axis of the ram 1 to receive the self-checking or retarding setting screw 5. By the eccentric positioning or mounting of the setting screw 5, the contact point of the screw on the surface of the valve shaft relative to the rotary movement of the ram 1 and valve 2, will be adjusted as to each other to reduce the friction to a minimum. The self-restraint is achieved by a small differential screw thread having a small increased gradient or pitch operative by an upper and lower screw thread pitch in a circular groove of the setting screw 5. The internal teeth 6 in the screw 5 as for example twelve edge elements serve the purpose to receive an inserted twelve-edged tool key, not shown. Two holes 7 in the upper surface of the ram 1 are for the purpose of ventilating the chamber or space in which the ram reciprocates and also to hold the ram when an adjustment is to be made in the play of the valve.

The cam shaft 8 immediately above the ram 1 has relatively wide cams 10, FIG. 2, separated by a middle groove 9 having a circumference of the base which extends over an angle α, FIG. 1. In the range of the base circumference angle α and within the middle groove 9, there is a transverse bore 11 in the valve shaft 8 and over the setting screw 5 which is for the purpose of inserting a specific twelve-edged key, not shown, for insertion into the setting screw. By an oval strengthening of the cross section of the cam shaft at the bore 11, there is avoided a weakening of the cam shaft 8.

To adjust the play in the valve, it is not necessary to remove the cam shaft, since it is merely necessary to rotate the shaft only to such extent that the transverse bore 11 will be coaxial with the setscrew 5 or stem 1, with the cam 10 turned toward the ram 1. The screw 5 will then be turned by the key tool inserted through the bore 11 and thus the valve play may be adjusted as desired.

FIGURES 5 and 6 illustrate a modified structure in which instead of two cams there is but one cam 10' with the bore 11' passing approximately through the center of the cam 10'.

As shown in FIGURE 3 there are two sections of screw threads 12 and 13 separated by a circular groove 14 so that thus a small differential screw thread action is achieved.

I claim as my invention:

1. A valve mechanism for internal combustion engines, comprising at least one valve stem and a cam shaft provided above the valve stem, a ram provided on the stem end of the valve having a top surface to be contacted by the cam shaft and having a threaded bore therein extended through the top surface, and a setting screw in contact with and in the threaded bore which upon rotation will adjust the play in the valve stem, the cam shaft being provided with a bore which when aligned with the setting screw permits adjustment of the screw through the bore in the cam shaft.

2. A valve mechanism for internal combustion engines, comprising at least one valve stem and a cam shaft provided above the valve stem, a ram provided on the stem end of the valve having a top surface to be contacted by the cam shaft and having a threaded bore therein extended through the top surface, and a setting screw in contact with and in the threaded bore which upon rotation will adjust the play in the valve stem, the cam shaft being provided with a bore which when aligned with the setting screw permits adjustment of the screw through the bore in the cam shaft, and the bore in the cam shaft being provided adjacent a cam of the cam shaft.

3. A valve mechanism for internal combustion engines, comprising at least one valve stem and a cam shaft provided above the valve stem, a ram provided on the stem end of the valve having a top surface to be contacted by the cam shaft and having a threaded bore therein extended through the top surface, and a setting screw in contact with and in the threaded bore which upon rotation will adjust the play in the valve stem, the cam shaft is provided with a bore which when aligned with the setting screw permits adjustment of the screw through the bore in the cam shaft, the bore in the cam shaft being provided in a cam itself of the cam shaft.

4. A valve mechanism for internal combustion engines, comprising at least one valve stem and a cam shaft provided above the valve stem, a ram provided on the stem end of the valve having a top surface to be contacted by the cam shaft and having a threaded bore therein extended through the top surface, and a setting screw in contact with and in the threaded bore which upon rotation will adjust the play in the valve stem, the cam shaft being provided with a bore which when aligned with the setting screw permits adjustment of the screw through the bore in the cam shaft, and the bore in the cam shaft being provided between two cams of the cam shaft.

5. A valve mechanism for internal combustion engines, comprising at least one valve stem and a cam shaft provided above the valve stem, a ram provided on the stem end of the valve having a top surface to be contacted by the cam shaft and having a threaded bore therein extended through the top surface, and a setting screw in contact with and in the threaded bore which upon rotation will adjust the play in the valve stem, the cam shaft being provided with a bore which when aligned with the setting screw permits adjustment of the screw through the bore in the cam shaft, and the bore in the cam shaft being provided in a section of the shaft which has an enlarged cross section.

6. A valve mechanism for internal combustion engines, comprising at least one valve stem and a cam shaft provided above the valve stem, a ram provided on the stem end of the valve having a top surface to be contacted by the cam shaft and having a threaded bore therein extended through the top surface, and a setting screw in contact with and in the threaded bore which upon rotation will adjust the play in the valve stem, the cam shaft is provided with a bore which when aligned with the setting screw permits adjustment of the screw through the bore in the cam shaft, by means of a tool passing through the bore of the cam shaft and into the setting screw to thus adjust the position of the ram on its valve stem.

7. A valve mechanism for internal combustion engines, comprising at least one valve stem and a cam shaft provided above the valve stem, a ram provided on the stem end of the valve having a top surface to be contacted by the cam shaft and having a threaded bore therein extended through the top surface, and a setting screw in contact with and in the threaded bore which upon rotation will adjust the play in the valve stem, the cam shaft being provided with a bore to be aligned with the setting screw to receive a tool passing through the bore in the cam shaft to rotate the setting screw for adjustment.

References Cited by the Examiner

UNITED STATES PATENTS

| | | | |
|---|---|---|---|
| 1,622,203 | 3/1927 | Napier et al. | 123—90 X |
| 2,131,507 | 9/1938 | Goodwin | 123—90 |
| 3,002,508 | 10/1961 | Barker et al. | 123—90 |
| 3,002,509 | 10/1961 | Fitzgerald et al. | 123—90 |
| 3,102,524 | 9/1963 | Celli | 123—90 X |

MARK NEWMAN, *Primary Examiner.*

CARLTON R. CROYLE, *Examiner.*

A. L. SMITH, *Assistant Examiner.*